(No Model.) 2 Sheets—Sheet 1.
J. W. BLEVIN.
Header.
No. 242,868. Patented June 14, 1881.
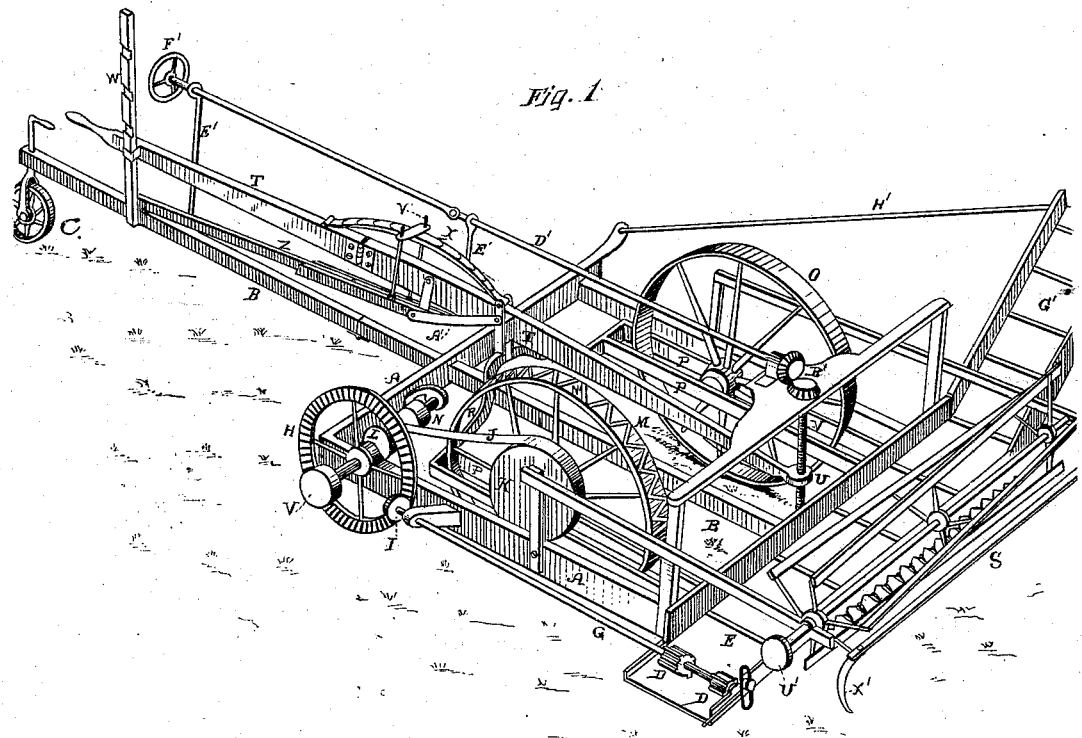
Witnesses
Geo H. Strong.
Frank H. Crook.
Inventor
Joseph W. Blevin
By Dewey & Co.
Attys (No Model.) 2 Sheets—Sheet 2.

J. W. BLEVIN.
Header.

No. 242,868. Patented June 14, 1881.

Witnesses
Geo. H. Strong.
Frank A. Brooks

Inventor
Joseph W. Blevin
By Dewey & Co.
Attys

UNITED STATES PATENT OFFICE.

JOSEPH W. BLEVIN, OF YUBA CITY, CALIFORNIA, ASSIGNOR OF ONE-HALF TO JOSEPH E. DEMPSEY, OF SAME PLACE.

HEADER.

SPECIFICATION forming part of Letters Patent No. 242,868, dated June 14, 1881.

Application filed November 26, 1880. (No model.)

*To all whom it may concern:*

Be it known that I, JOSEPH W. BLEVIN, of Yuba City, county of Sutter, State of California, have invented an Improvement in Headers; and I hereby declare the following to be a full, clear, and exact description thereof.

My invention relates to certain improvements in that class of machines for cutting grain and delivering it into wagons known as "headers;" and it consists in the several combinations of devices hereinafter explained and claimed.

Figure 3:
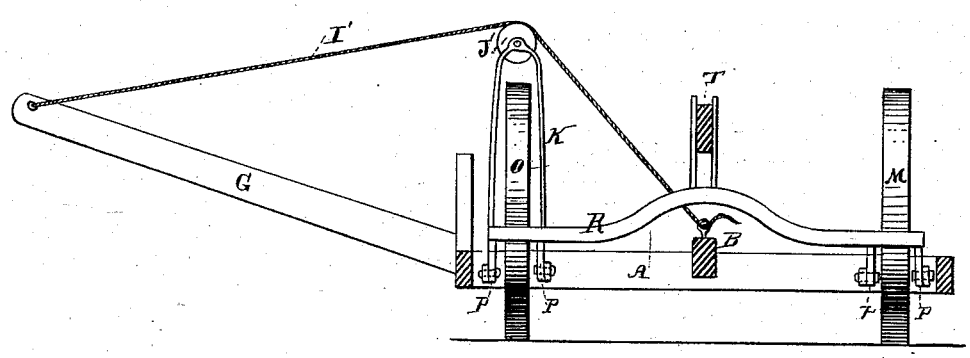
Figure 4:
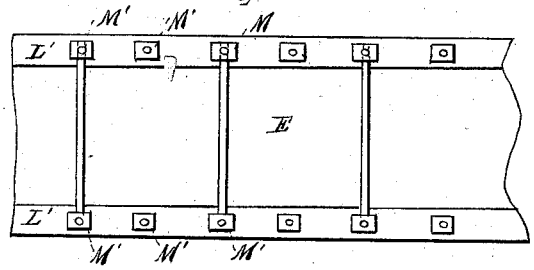
Figure 5:
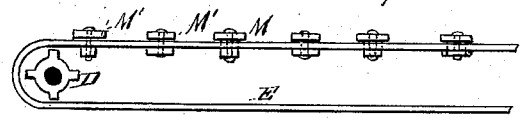
Figure 6:
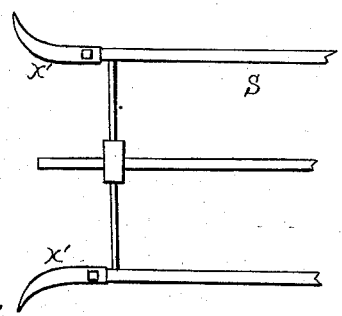

Referring to the accompanying drawings, Figure 1 is a view of my header. Fig. 2 is a longitudinal section. Fig. 3 is a transverse section. Figs. 4, 5, and 6 are details of construction.

A represents the central frame of a header; B the draft bar or pole, the rear end of which the driver occupies within reach of the steering-wheel C, the team being connected with the rear end of the pole in the usual manner.

The draper or carrying-belt E is driven by the same shaft, G, which drives the cutters F, said shaft being operated by the gearing-wheels H and I, chain-belt J passing over the chain-pulleys K and L revolved by the driving-wheels M, and having an ordinary clutch, N, for throwing it in and out of gear. The other running wheel is set within the frame opposite to the driving-wheel M, and is represented by O. The wheels M and O have their bearings within the supplementary frame P, hinged to the forward end of the frame A, and movable up or down about the the axle of the wheels. The rear ends of the frame P are connected by the bar R, which is loosely attached by a fork, S, to the actuating-lever T. The lever T has its forward end secured by a nut, U, to the upright screw V, set in a plate upon the forward end of the draft-bar B or frame-work of the machine. The rear end of the lever T is within reach of the driver, and is held at any desired point by the upright rack or catch W. On top of the lever T, about its center, is the leaf-spring X, having one end attached to the fork S and the other to the lever, as shown. The connecting-rods Y attach the spring to the auxiliary lever Z under the lever T, said lever Z passing backward through a guide, and having its end resting upon the draft-bar B, having at that point its fulcrum. The side strips, A', connect the lever Z with the fork S for further security. Now, when the lever T is depressed, the supplementary wheel-frame P are pushed down, while the front of the frame A is raised, and with it the draper or carrying-belt E, and on account of the supplemental wheel-frame P, and the manner of their connection, the fulcrum is transferred from the axle of the wheels, where it usually is in ordinary machines, to the rear end of the draft-bar B, so that the central frame, A, with its draper E, in being elevated or depressed, describes an arc of so great a circle as to practically keep them on a level, and thus grain cannot fall back and be lost.

In the ordinary machines the point about which they turn is the axle of wheels, and that point being near the draper E causes it to describe an arc of a small circle, and to present too great an angle to the ground, whereby the short grain, when cut, falls forward and is lost.

By reason of the wheel-frame P, I can use larger wheels than are now in use, because I do not increase the inclination of my frame in as great a ratio as would be the result in an ordinary machine. Attaching the supplemental frame P to the forward end of the frame A, and having the wheels journaled within said frame P, transfers the draft to the front, so that although the horses are behind the machine, their power is rather a pulling than a pushing force.

The leaf-spring X, with its auxiliary lever Z, enables the driver to easily use the lever, giving him power to raise a heavy frame and bring the whole operation within his power.

In order to regulate the limits of the elevation or depression of the frame A, I place bevel-gearing B', supported by the beam C', to turn the upright screw V. A curved metal bar or brace (not shown) fits behind the screw V, strengthening it and acting as a guide for the nut U. A rod, D', operates the bevel-gear and passes back, supported by rods E', to within reach of the driver, where the hand-wheel F' or a crank enables him to turn it. The screw V is thus turned and works the nut U on the lever T up or down, thus regulating the point of attachment of the lever T.

G' represents the elevator-spout hinged to the frame and finger-bar on the side opposite to the driving-wheel M, (as shown,) its outer end being supported by the bar H' passing under it diagonally and thence to the rear end of the frame A, to which it is attached loosely or hinged so as to be movable.

A rope, I', is attached to the outer end of the elevating-apron and passes over the pulley J', set upon an upright frame, K, fastened to the supplemental frame P of the wheel O, and thence down to the draft-bar B, where it is fastened. By this arrangement the elevating-apron is given a self-regulating motion the reverse of that communicated to the frame A, so that when the frame A is depressed the spout is elevated, and vice versa, thus giving it the proper elevation when the machine is at work to load the header-wagon.

The draper or carrying-belt E passes over the ribbed pulleys D on the shaft G, and along the elevating-apron G', returning over an ordinary roller-pulley at the upper end of the elevating-apron. Across the draper E, on its inner side, are leather straps L', on the ends of which are the metal burrs M', bolted through the draper, as shown. These burrs engage with the elevated ribs of the pulleys D, thus insuring the revolution of the belt and allowing me to drive it from the rear end, at the same time keeping its upper surface taut, because the tension on the belt takes place throughout its whole length from the lower part of the pulleys, by which it is driven.

Upon the periphery of the driving-wheel M is the V-shaped rib N', for preventing slipping and insuring the revolution of the wheel. By this shape of the rib the jar to which the ordinary wheels, which have a series of transverse ribs, are subjected when traveling on hard ground is prevented, because the rib here shown presents an even and continuing surface. By placing the driving mechanism upon the wheel opposite to the side on which the spout is placed the side draft caused by the projecting spout is counteracted.

P' represents the fingers, curved as shown, and R' the finger-bar, made of channel-iron, in which one side of the draper E runs. The construction of the finger-bar of channel-iron renders it stiff and light, and gives it a small upper surface. The ordinary finger-bars are made of heavy timber, and the distance from the knives to the draper is so great that much of the grain is lost before reaching it; but in my finger-bar this is obviated, the channel-iron being light, stiff, and small. The finger-bar R' is secured to the frame by having forked clips (not shown) riveted to it, the forks of which embrace the projecting ends of the frame-timbers, as shown.

The reel S' is supported by the side frames, T', and revolved by the pulleys U' V'. It has curved projections X' on the end of each of its arms, bolted thereon by a single bolt, as shown, so that they can be adjusted with reference to the height of the reel, which is sometimes changed. These projections X' are for the purpose of drawing in grain separated out by the gage or dividing-shoe.

Having thus described my invention, what I claim as new, and desire to secure by Letters Patent, is—

1. In a header, the supplemental wheel-frame P, having the wheels M and O journaled therein, said frame being hinged to the forward end of the main frame A, and having the rear end free, in combination with the lever T, hinged to the front of the main frame and connected with the rear of the supplemental frame, the whole operating substantially as and for the purpose described.

2. The main frame A, supplemental wheel-frame P, draft bar or pole B, and the lever T, in combination with the supplemental lever Z, having its front end hinged to the lever T, and its rear end resting upon the pole B, and the spring X, having the rear end resting upon the lever T, its front end connected with the fork S of the frame P, while its arched central portion is united with the arm or lever Z, substantially as and for the purpose herein described.

3. The means for raising and lowering the forward end of the lever T, consisting of the vertical screw V, beveled gearing B', and rod D', said screw turning within the nut U, which is hinged or connected to the front end of the lever T, substantially as herein described.

4. The spout G', hinged to one side of the main frame A of a header at its front end, and connected with the rear of the same side by the diagonal brace H', in combination with the wheel-frame P, having a vertical movement independent of the main frame, and the rope or chain I', extending from the spout to the pole on the main frame and passing over the pulley J', which is supported from the supplemental or wheel frame, substantially as and for the purpose herein described.

5. The frame A, having the pole B rigidly secured to it, its rear end supported upon the steering-wheel C, in combination with the wheels M and O, having their axles journaled in the independent supplemental frame P, said frame having its front end hinged to the front portion of the main frame and its rear end connected with the lever T, substantially as and for the purpose herein described.

In witness whereof I have hereunto set my hand.

JOSEPH W. BLEVIN.

Witnesses:
H. C. GROVER,
W. T. BLEVIN.